Sheet 2-2 Sheets.
W. S. Irish.
Loom.
Nº 12,596. Patented Mar. 27, 1855.
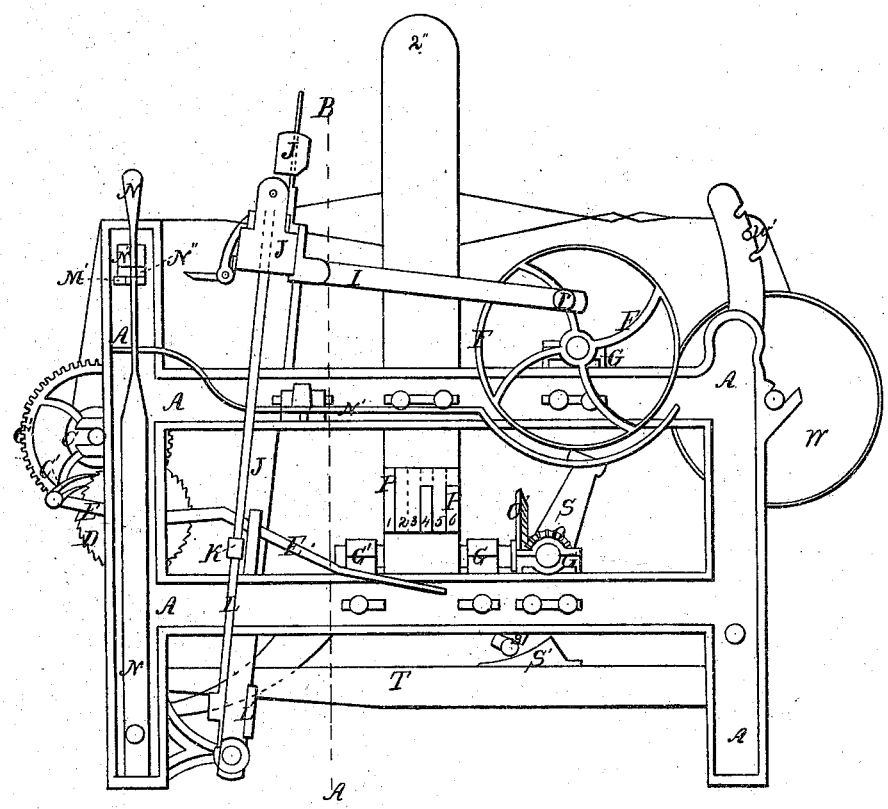
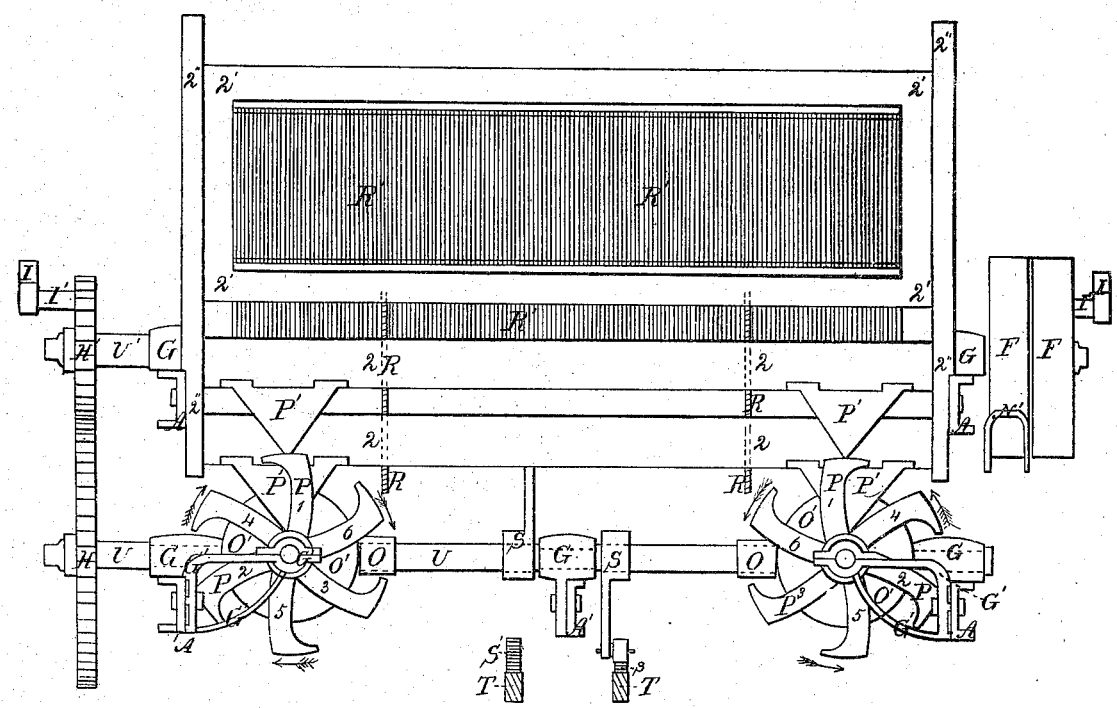
N. PETERS, PHOTO-LITHOGRAPHER, WASHINGTON, D.C.

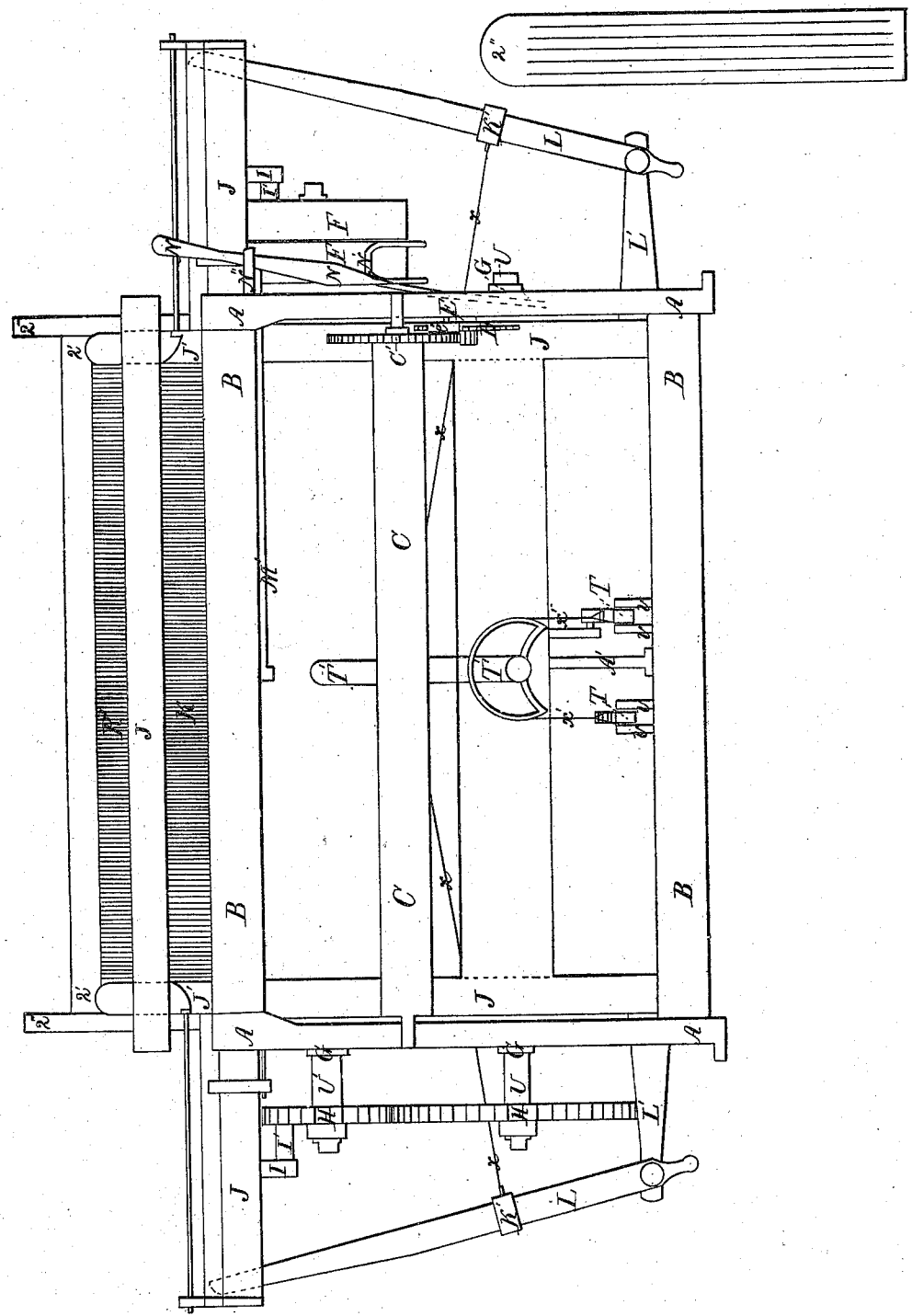

UNITED STATES PATENT OFFICE.

WILLIAM S. IRISH, OF MIDDLEBURY, OHIO.

LOOM.

Specification of Letters Patent No. 12,596, dated March 27, 1855.

*To all whom it may concern:*

Be it known that I, WILLIAM S. IRISH, of Middlebury, in the county of Summit and State of Ohio, have made certain Improvements in Power-Looms; and I do hereby declare that the following is a full description thereof, reference being had to the accompanying drawings and to the letters and reference marked thereon.

The nature of my improvement consists in working the harness by the immediate application of the cams thereto, which I accomplish substantially as follows.

I place the harness Q, Q', between the upright guides Q" which keep them in proper position. Underneath and attached to the frame of the harness, and near each end thereof, I affix what I denominate a shoe P', one face of each presenting an inverted incline to the cams P, which I place underneath the harness Q, Q' and so arrange them, that in their revolutions they act immediately and simultaneously upon the shoes or projections of the harness frames, and thus raise alternately the different leaves of the harness; the harness being of sufficient weight to fall by their own gravity.

I do not claim as my invention, the harness frame, upright, cams, or shoes, but

What I claim as my invention and desire to secure by Letters Patent, is—

The method of raising the harness by the immediate application of the cams to the shoes or projections of the harness, substantially as set forth.

2. My improvement consists mainly in its simplicity, dispensing with the use of treadles, cording, strapping, &c., the facility and ease of changing from one species of fabric to another, cheapness of construction, durability, ease of putting up and keeping in order and requires less power to operate.

WILLIAM S. IRISH.

In presence of—
  N. W. GOODHUE,
  JNO. B. SMITH.